Aug. 2, 1927.

C. W. MANZEL 1,637,869

LUBRICATING APPARATUS

Filed March 26, 1925   3 Sheets-Sheet 1

Inventor,
Chas. W. Manzel,
by Geyer & Geyer
Attorneys.

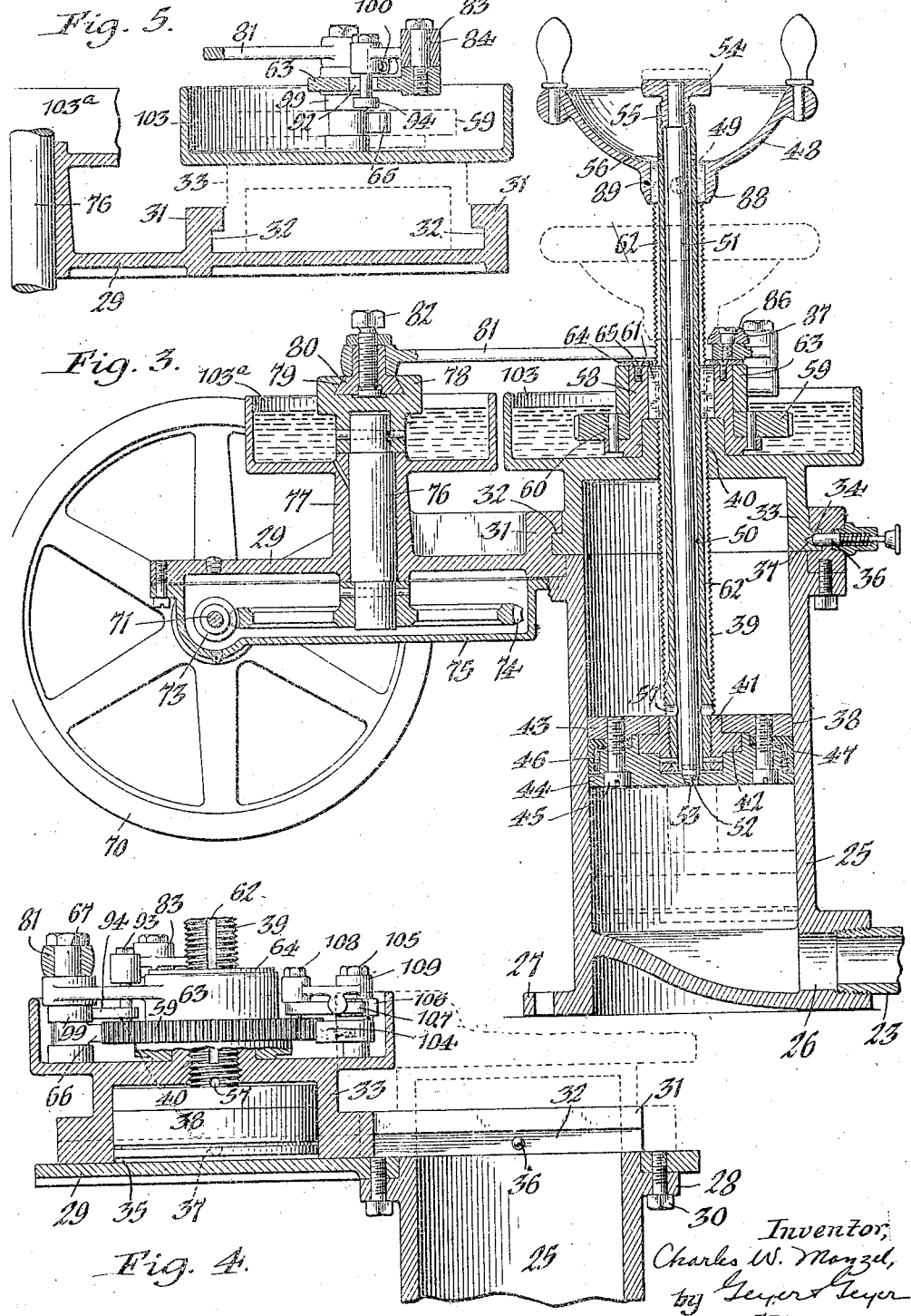

Aug. 2, 1927.
C. W. MANZEL
1,637,869
LUBRICATING APPARATUS
Filed March 26, 1925  3 Sheets-Sheet 3
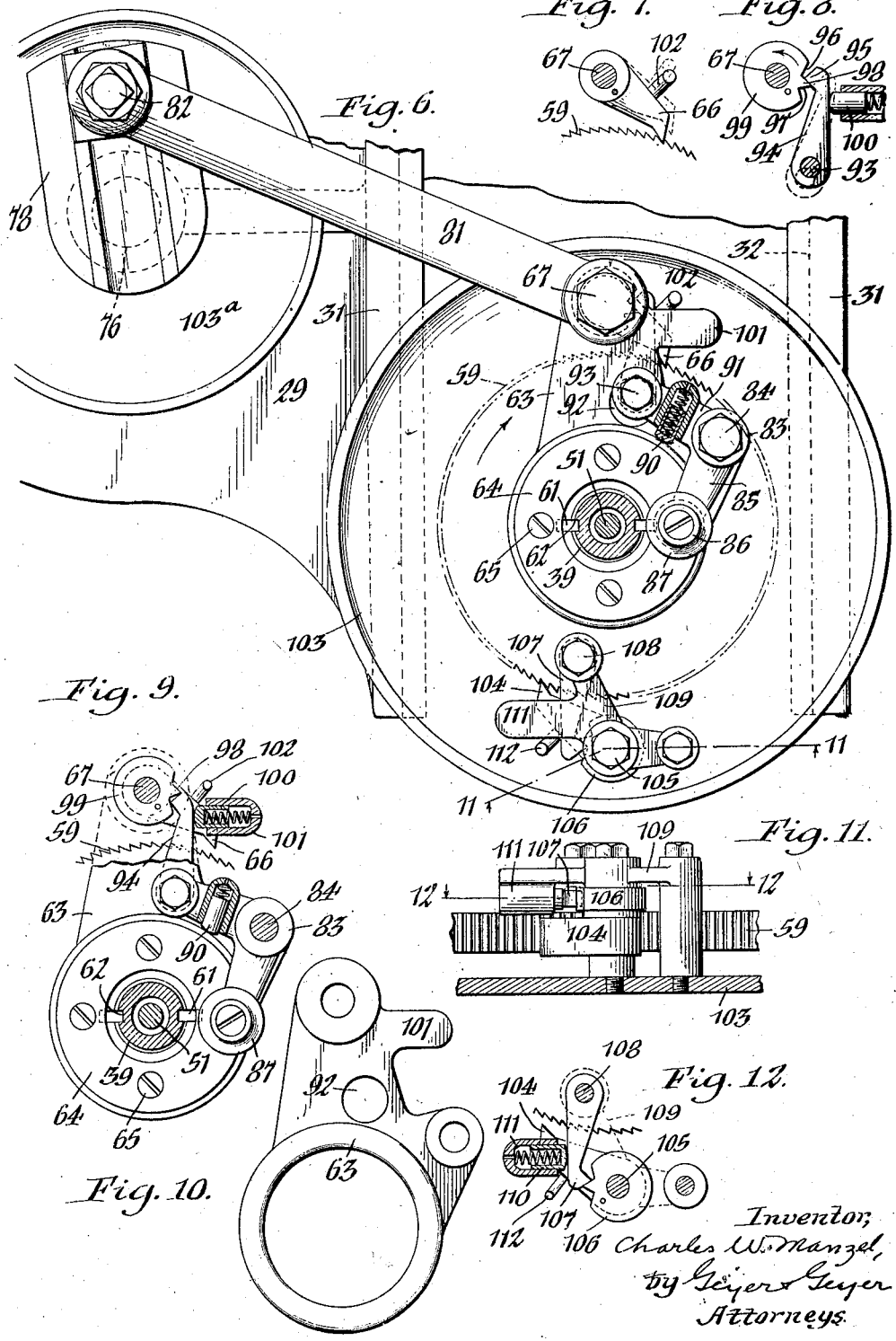

Patented Aug. 2, 1927.

1,637,869

UNITED STATES PATENT OFFICE.

CHARLES W. MANZEL, OF BUFFALO, NEW YORK.

LUBRICATING APPARATUS.

Application filed March 26, 1925. Serial No. 18,440.

This invention relates to a lubricating apparatus which is more particularly intended for use with hydraulic turbines, but may also be used with other machinery. One of its chief objects is to provide a grease lubricator for hydraulic turbines which is efficient and reliable in operation, and which automatically feeds the grease to the bearings to be lubricated.

Another object of the invention is the provision of means for automatically arresting or stopping the discharge of grease from the container or cylinder at a predetermined point in the operation of the apparatus.

A further object is to provide a lubricating apparatus which is so constructed and organized that it can be readily installed on turbines now in use without altering their construction, and which is provided with simple means for adjusting or adapting it to any speed within a certain range.

Still further objects of the invention reside in the particular construction and arrangement of parts which will hereinafter be more fully described and specifically pointed out in the appended claims.

Figure 1:
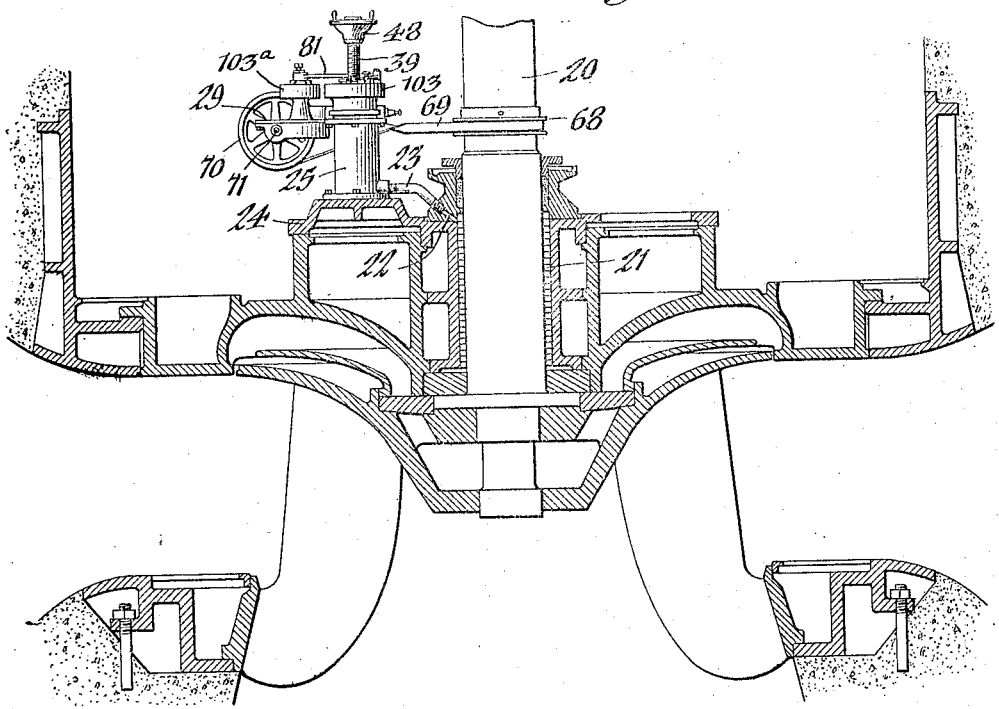
Figure 2:
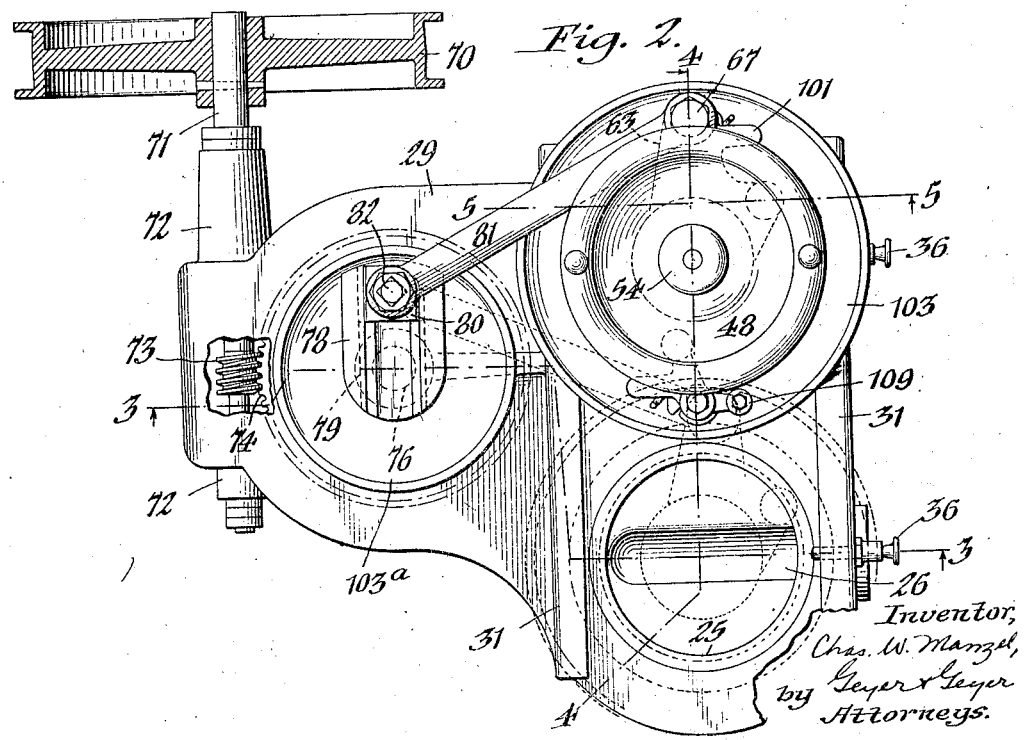

In the accompanying drawings:

Figure 1 is a vertical, longitudinal section of a well-known type of hydraulic turbine showing my invention in connection therewith. Figure 2 is a top plan view, partly in section, of the lubricating apparatus. Figure 3 is an enlarged vertical section thereof in the plane of line 3—3, Fig. 2, the piston being in position within the grease cylinder. Figure 4 is an enlarged fragmentary transverse section on line 4—4, Fig. 2, the piston being shown withdrawn from the cylinder and shifted to one side thereof for filling. Figure 5 is an enlarged fragmentary vertical section on line 5—5, Fig. 2. Figure 6 is an enlarged top plan view showing the feed-operating mechanism. Figures 7 and 8 are detailed views, partly in section, of the feed-pawl and trigger, respectively. Figure 9 is a plan view, partly in section, of the feed-pawl carrying arm and associated parts. Figure 10 is a top plan view of the feed-pawl carrying arm. Figure 11 is a vertical section on line 11, 11, Fig. 6. Figure 12 is a horizontal section on line 12—12, Fig. 11.

Similar characters of reference indicate corresponding parts throughout the several views.

By way of example, the invention is shown in connection with an hydraulic turbine of well-known construction, 20 indicating the turbine shaft, 21 the shaft-bearing which usually consists of lignum vitæ blocks, and 22 the grease-inlet passage leading to this bearing and connected by a pipe or conduit 23 with the lubricating apparatus, which is conveniently located and supported on the turbine-frame 24.

In its general organization this apparatus comprises a grease chamber or cylinder having a head movable across its open end to enable the filling of the cylinder from time to time, a piston operable in said cylinder for expelling the grease therefrom, and means driven from the turbine for operating the piston intermittently at a comparatively slow speed.

25 indicates the grease reservoir or chamber which is preferably in the form of a cylinder closed at its bottom and open at its top, the bottom having a transverse, grease-discharge passage 26 into the outlet end of which the pipe 23 is connected. The lower end of this cylinder has an attaching flange 27 by means of which the lubricating apparatus is fastened to the turbine-frame 24, as shown in Fig. 1. At its upper end, said cylinder is provided with an outwardly-facing annular flange 28 upon which an overhanging, horizontal table or support 29 is mounted, the same being secured to said flange by bolts 30 or other appropriate fastenings and constituting a platform upon which the various working parts of the apparatus are mounted. To this end, it contains a pair of longitudinal guides 31 containing horizontal grooves or channels 32, which are spaced apart a distance approximately equal to the external diameter of the grease cylinder and which extend over and a suitable distance beyond one side of said cylinder, as shown in Figs. 2 and 4. Mounted on the platform-guides for movement across the open end of the cylinder, is a longitudinally-slidable, hollow cylinder-head 33 having flanges or tongues 34 extending outwardly from its lower end for engagement with the companion guide-grooves 32. In the normal operating position of the apparatus, the cylinder-head is in line with and forms a continuation of the cylinder 25, the same having a downwardly-opening pocket or recess 35 therein for this purpose, as seen in Fig. 3. When it is desired to refill the cylinder with lubricant, the cylinder-head is shifted manually to one side to uncover the cylinder, as shown by full lines in Figs. 2 and 4. Said cylinder-head is preferably locked in either of the aforesaid positions by spring-pressed locking bolts 36 mounted on one of the cylinder head guides and arranged to register with corresponding openings 37 formed in the cylinder-head flanges 34.

Operable in the cylinder 25 for expelling the grease therefrom under pressure to the bearing or bearings to be lubricated, is a piston 38, which, during the filling of the cylinder, is adapted to extend into the cylinder-continuation or pocket 35 formed in the cylinder-head 33. This piston is mounted on the lower end of a piston-rod which preferably consists of a screw 39 extending through an internally-threaded collar or nut 40 rising from the top wall of the cylinder-head. To permit the screw to rotate independently of the piston during the movement of the latter in its cylinder and to insure ease of operation of these parts, the piston is preferably mounted on a sleeve or swivel-bearing 41 pinned or otherwise secured to the lower end of the screw. The swivel is provided intermediate its ends with a flange 42 and the piston is composed of upper and lower sections 43, 44, respectively, which are disposed on opposite sides of said swivel-flange and fastened to each other by bolts 45, this arrangement preventing longitudinal displacement of the piston relative to its actuating screw. Arranged between the opposing faces of the piston-sections is a cup-packing 46 of any suitable material, a spring washer 47 being provided for constantly urging the flanged portion of the piston-packing snugly against the cylinder bore to insure against leakage of the lubricant past the piston.

At its upper end, the piston, actuating screw 39 is provided with a bowl-shaped hand wheel 48 for manually moving the piston in its cylinder. This wheel may be secured to said screw by a set screw 49 or other fastening.

Means are provided for expelling any air which might be present in the grease after charging the cylinder therewith and also for venting the latter and discharging any lubricant which may have forced its way above the piston. For accomplishing these desired results, the screw 39 is of tubular form and extending freely into its bore 50 is a longitudinally-movable valve-stem 51 terminating at its lower end in a valve-face 52 for controlling a vent-port 53 formed in the lower piston-section 44 and communicating with the screw-bore, as shown in Fig. 3. At its upper end the valve-stem has an actuating knob 54, which, as shown at 55, has screw-threaded engagement with the upper end of the bore 50 to permit the opening and closing of its valve. It will be noted that the tubular screw extends a suitable distance into the bowl of the hand-wheel 48 and is provided in such portion with one or more outlet ports 56 through which the air or grease is expelled from the bore of the screw into the bowl. At its lower end immediately above the top wall of the piston, the screw has one or more inlet ports 57 through which any air or grease trapped between the piston and the cylinder-head may be expelled. In practice, after the contents of the cylinder has been discharged and prior to raising the piston in its cylinder to refill the latter, the valve-stem 51 is turned in the proper direction to open the vent-port 53, whereby any air or grease above the piston is allowed to be displaced into the cylinder through the ports 57, screw-bore 50 and said vent-port.

The means for automatically moving the piston downwardly and intermittently at a comparatively slow rate of speed to effect the discharge of the lubricant from the cylinder to the bearings to be treated, are preferably constructed as follows:

Revolubly mounted on the collar 40 of the cylinder-head 33 and suitably held against vertical displacement thereon is a hub or bushing 58 to which a ratchet wheel 59 is fixed by pins 60. Said bushing is provided with one or more keys 61 which engage corresponding grooves or key-ways 62 formed in the screw 39 and extending substantially from end to end thereof, so that as rotary motion is imparted to the ratchet, the screw is compelled to turn therewith and move lengthwise relative thereto. Freely mounted on the hub 58 above the ratchet wheel is a horizontally swinging rocker arm 63 which bears at its lower end against the top face of said ratchet wheel while its upper end bears against a plate 64 secured to the top of the hub by screws 65, shown clearly in Fig. 3. At its outer end this rocker arm carries a feed pawl 66 fulcrumed on the lower end of a bolt 67 extending through said arm. The latter is rocked to intermittently rotate the ratchet wheel through the medium of a driving mechanism preferably deriving its power directly from the turbine-shaft 20. To this end, the turbine-shaft is provided with a pulley 68 connected by a belt 69 with a pulley 70 mounted on a horizontal, driven shaft 71 journaled in suitable bearings 72 formed in the supporting table 29. A worm 73 mounted on this driven shaft meshes with a worm-wheel 74 contained within a suitable case formed by the table 29 and a cover-plate 75, said worm-wheel being fixed on the lower end of an upright shaft 76 journaled in a bearing 77. At its upper end this upright shaft is provided with a crank 78 containing a dove-tail groove 79 in which is guided a radially-adjustable slide 80 connected by a link or connecting rod 81 with the rocker arm 63. A screw 82 is employed for fastening the slide in a set position on the crank. By adjusting this slide toward and from the axis of the upright shaft 76, the stroke or throw imparted to the rocker arm is reduced or increased accordingly, resulting in a corresponding variation in the speed of travel of the piston 38 in its cylinder 25. Furthermore, by this adjustment feature, the lubricating apparatus can be readily adapted to any turbine-speed within a limited range.

Means are provided for manually disengaging the feed pawl 66 from the ratchet wheel 59 at will, as well as automatically effecting such release of the feed pawl when the piston has reached substantially the limit of its down or operating stroke. The preferred means for accomplishing these results, are constructed as follows:—

83 indicates a pawl-releasing member or bell crank lever which is fulcrumed at 84 to the rocker arm 63 to swing horizontally thereon. The inner arm 85 of this bell crank extends alongside the screw 39 and is provided with a roller 86 having a beveled or inclined annular bearing face 87 with which a correspondingly-shaped face 88 formed on the head-wheel hub 89 is adapted to engage at a predetermined point in the operation of the lubricating apparatus for actuating or shifting said bell crank lever to a position to release the feed pawl from the ratchet wheel. A spring-pressed plunger 90, carried by the outer arm 91 of the bell crank and bearing at its outer end against the opposing face of the rocker-arm hub, serves to normally hold said bell-crank in the position shown in Figs. 3 and 6, in which the roller 86 is arranged in the path of movement of the hand-wheel hub 89. Depending from the free end of the outer bell-crank arm 91 and extending through an enlarged opening 92 in the adjacent portion of the rocker arm 63 is a pivot bolt 93 upon the lower end of which a horizontally-swinging trigger-arm 94 is fulcrumed, the same being disposed in the space between the rocker arm and ratchet wheel, and the lower end of said pivot bolt bearing directly on the upper side of the latter, as shown in Figs. 4 and 5. The outer end of the trigger terminates in a tooth 95 which is adapted to interlock with one or the other of a pair of notches 96, 97 arranged on the opposite sides of a pointed tooth 98 and formed on the peripheral face of a locking disk or collar 99 pinned to or integral with the hub of the feed pawl 66 to move therewith. A spring-pressed plunger 100 carried by a lateral extension 101 of the rocker arm serves constantly to urge the trigger 94 toward the locking disk.

In order to manually effect the release of the feed pawl from the ratchet wheel, the former is provided with a suitable handle 102 which is grasped to swing the pawl from the position shown by full lines to the position shown by dotted lines in Fig. 7. During this movement, the locking disk 99 is likewise turned a fraction of a revolution, the trigger being released from the notch 96 and then allowed to snap into the other notch 97 to reliably hold the pawl in its released position.

The automatic disengagement of the feed pawl from the ratchet wheel takes place, as before stated, when the piston reaches the position shown by dotted lines in Fig. 3. When the piston approaches this position, the beveled face of the hand-wheel hub 89 encounters the roller 86 and shifts the bell-crank lever 83 from the position shown in Fig. 6, to that shown in Fig. 9, carrying the trigger 94 with it out of its notch 96 to the position shown by dotted lines in Fig. 8. Immediately after the tooth 95 of this trigger passes the point of the tooth 98 on the locking disk 99, the spring-pressed plunger 100 forces said trigger into engagement with the companion notch 97. In approaching this position, due to the inclination of the contacting faces of the trigger tooth and locking disk tooth, the locking disk is compelled to turn in the direction of the arrow seen in Fig. 8, moving the feed pawl with it and releasing the same from engagement with the ratchet wheel to prevent further movement of the piston downwardly in its cylinder.

For the purpose of providing this apparatus with self-contained means for lubricating its various working parts, a pair of lubricant-containing chambers or bowls 103, 103$^a$ are provided. As shown in Fig. 3, the bowl 103 is preferably formed on the cylinder-head 33 and the lubricant contained therein serves to lubricate the screw, ratchet wheel and other associated parts. The bowl 103$^a$ is formed on the upper end of the shaft-bearing 77 and serves to lubricate said bearing and the other parts of the transmission mechanism.

To prevent the ratchet wheel 59 from backing up during the operation of the apparatus, an escapement pawl 104 is provided which is preferably retained in its operative and inoperative positions by mechanism substantially similar to that employed in connection with the feed pawl 66. As shown in Figs. 6, 11 and 12, this escapement pawl is pivoted to a pivot-bolt 105 and pinned to said pawl is a notched locking disk 106 with one or another of whose notches a trigger 107 is adapted to interlock for holding said pawl in its engaged or released position. This trigger is pivoted at 108 to the inner arm of a substantially L-shaped bracket 109 which is bolted or otherwise secured to the bottom of the bowl 103. A spring-pressed plunger 110 mounted in an extension 111 of the bracket serves to yieldingly retain the trigger in engagement with the locking disk. As shown in Fig. 4, the inner arm of the bracket 109 overhangs the ratchet wheel and the trigger 107 is disposed in the space between the bracket and the ratchet wheel, the lower end of the pivot bolt 108 bearing directly on the upper side of the latter. The escapement pawl is engaged and disengaged manually and for this purpose may be provided with a suitable handle 112.

Vertical displacement of the ratchet wheel 59 relative to the piston feed-screw 39 is effectually prevented by the pivot bolt 108, which bears on the upper side of said wheel and holds it down against the bottom of the bowl 103.

Briefly stated, the operation of the apparatus is as follows:

Assume the parts to be in the position for filling the cylinder 25, as shown by full lines in Figs. 2 and 4, in which position the cylinder-head 33 is located at one side of the cylinder to enable the latter to be conveniently charged with grease or other lubricant to be used and the feed and escapement pawls 66 and 104, respectively, are disconnected from the ratchet wheel 59, as shown in Figs. 9 and 12. After the cylinder is charged with lubricant, the cylinder-head is moved in line with its cylinder as shown by dotted lines in Figs. 2 and 4 and by full lines in Fig. 3. The piston-actuating screw is now turned by hand to properly compress or pack the grease in the cylinder, the valve 52 having been previously opened to expel any air, which might be present in the grease, through the vent port 53 and screw-passage 50 into the atmosphere. After closing this valve, the apparatus is then ready for automatic operation and the feed and escapement pawls are engaged with the ratchet wheel through the medium of their respective handles 102, 112. By the feed arrangement shown, the piston is intermittently and slowly advanced in its cylinder, keeping the turbine bearing 21 thoroughly lubricated for a considerable period of time before it is necessary to refill the cylinder.

When the piston approaches the end of its stroke, shown by dotted lines in Fig. 3, the beveled hub-face 88 on the hand-wheel 48 encounters the roller 86 of the feed pawl-releasing member 83, which, as heretofore described, disengages the feed pawl 66 from the ratchet wheel, thereby arresting the movement of the piston independently of the driving mechanism. The escapement pawl 104 is then disengaged, the valve 52 is opened and the piston raised in its cylinder by simply turning the hand-wheel. As the piston is raised, a vacuum is created in the cylinder, causing any air or grease which has been pocketed above the piston to be expelled into the cylinder below the piston or into the bowl of the hand wheel. When the piston has receded into the recess 35 of the cylinder-head, the latter is moved to one side of the cylinder which can then be conveniently refilled.

I claim as my invention:—

1. In a lubricator for hydraulic turbines, comprising a container for the lubricant having an outlet, a piston movable in said container, a feed-screw for the piston movable lengthwise of the container, a ratchet wheel coaxial with said screw for turning it, a rocker arm fulcrumed on the hub of the ratchet wheel and carrying a feed pawl engaging the same, power-driven means for actuating said rocker arm, and combined shifting and locking means on the rocker arm for moving said pawl into and out of engagement with the ratchet wheel and maintaining it in either of such positions, said last-named means being movable in a plane parallel to the plane of movement of said rocker arm.

2. In a lubricator for hydraulic turbines, the combination of a container for the lubricant having an outlet, a piston movable in said container, a feed-screw for the piston movable lengthwise of the container, a ratchet wheel for turning said screw, a rocker arm having its fulcrum coaxial with the screw and carrying a feed-pawl engaging said ratchet wheel, means applied to said arm and movable laterally thereof in the plane of its movement for shifting said pawl into and out of its operative position, power driven means for actuating said rocker arm, and means on the screw for moving said pawl-shifting means in a direction to release the pawl from the ratchet wheel when the piston approaches the end of its operating stroke.

3. In a lubricator for hydraulic turbines, the combination of a container for the lubricant having an outlet, a piston movable in said container, a feed-screw for the piston, a ratchet wheel for turning said screw, a rocker arm coaxial with the screw and carrying a feed pawl engaging said ratchet wheel, means applied to said arm for shifting said pawl into and out of its operative position, power-driven means for actuating said rocker arm, means on said screw arranged for engagement with said pawl-shifting means for actuating the latter to release the pawl from the ratchet wheel when the piston approaches the end of its operating stroke, and means independent of the screw-actuated means for holding said pawl in its released position.

4. In a lubricator for hydraulic turbines, the combination of a container for the lubricant having an outlet, a piston operable therein, a feed-screw for the piston movable lengthwise of said container, a ratchet wheel coaxial with the screw for turning it, a rocker arm fulcrumed on the hub of the ratchet wheel and carrying a feed pawl engaging the same, power-driven means for actuating said rocker arm, a pawl-releasing member pivotally mounted on the rocker arm to swing in a plane parallel to the movement thereof, said member including a part arranged to yieldingly interlock with the pawl for holding it in its engaged or released position, and means on said screw for swinging said pawl-releasing member in a direction to cause its yieldable part to release the pawl from the ratchet wheel at a predetermined point in the piston-stroke.

5. In a lubricator for hydraulic turbines, the combination of a container for the lubricant having an outlet, a piston movable in said container, a feed-screw for the piston, a ratchet wheel for turning said screw, a rocker arm carrying a feed-pawl engaging said ratchet wheel, said feed-pawl having a pair of notches in its hub, means for actuating said rocker arm, a pawl-releasing member pivotally mounted on said rocker arm and including a trigger-arm arranged to yieldingly interlock with one or the other of said pawl-notches for holding the pawl in its engaged and released positions, respectively, and means for swinging said pawl-releasing member in a direction to cause its trigger to release the pawl from the ratchet wheel at a predetermined point of the piston-stroke.

6. In a lubricator for hydraulic turbines, the combination of a container for the lubricant having an outlet, a piston movable in said container, a feed-screw for the piston, a ratchet wheel for turning said screw, a rocker arm carrying a feed-pawl engaging said ratchet-wheel, the hub of said feed-pawl having a tooth and locking notches on opposite sides thereof, means for actuating said rocker arm, a pawl-releasing member pivotally mounted on said rocker arm and including a swinging trigger-arm having a tooth arranged to yieldingly interlock with one or the other of said locking-notches, means for yieldingly urging the pawl-releasing member in one direction, and means on said screw for moving said member in the opposite direction at a predetermined point of a piston-stroke to effect the release of the pawl from the ratchet wheel, the faces of the pawl-tooth being inclined in opposite directions, whereby the pawl is forced to swing into or out of engagement with the ratchet wheel when said trigger arm is engaged with one or the other of the locking notches in said pawl.

7. In a lubricator for hydraulic turbines, the combination on a container for the lubricant having an outlet in its lower end and an internally-threaded opening in its head, a piston movable in said container, a feed-screw for the piston engaging said threaded-opening and having a key-way extending lengthwise thereof, a ratchet wheel journaled on the container-head and having a key engaging said key-way, means for holding said ratchet wheel against movement lengthwise of said screw, a rocker arm mounted on the hub of the ratchet wheel and carrying a feed pawl engaging the latter, and means for actuating said rocker arm.

8. In a lubricator for hydraulic turbines, the combination of a container for the lubricant having an outlet in its lower end and an internally-threaded opening in its head, a piston movable in said container, a feed-screw for the piston engaging said threaded-opening and having a key-way extending lengthwise thereof, a ratchet wheel journaled on the container-head and having a key engaging said key-way, means for holding said ratchet wheel against movement lengthwise of said container, a rocker arm mounted on the hub of the ratchet wheel and carrying a feed pawl engaging the latter, an escapement pawl engaging the ratchet wheel, and means for actuating said rocker arm.

9. In a lubricator for hydraulic turbines, the combination of a container for the lubricant having an outlet in its lower end and an internally-threaded opening in its head, a piston movable in said container, a feed-screw for the piston engaging said threaded-opening and having a key-way extending lengthwise thereof, a ratchet wheel journaled on the container-head and having a key engaging said key-way, a rocker arm mounted on the hub of the ratchet wheel and carrying a feed pawl engaging the latter, means for actuating said rocker arm, a bracket mounted on the head of said container and overhanging the ratchet wheel to hold the same down and prevent its movement lengthwise of the container, and an escapement pawl for the ratchet wheel pivoted on said bracket.

10. A lubricator of the character described, comprising a container for the grease having an outlet, a piston and piston-rod movable in said container, said piston including a vent port in its bottom opening into said container, said piston-rod having a longitudinal passage communicating at its lower end with said piston-port and at its upper end with the atmosphere and a lateral passage immediately above the piston, and a valve for controlling the piston-port and having a stem extending freely through the piston-rod passage.

11. A lubricator of the character described, comprising a container for the grease having an outlet, a piston and piston-rod movable in said container, a bowl-shaped hand-wheel secured to the upper end of said piston-rod, the latter extending into the bowl of said wheel, said piston including a vent-port in its bottom opening into said container, said piston-rod having a longitudinal passage communicating at its lower end with said piston-port and opening at its upper end into said hand-wheel and a lateral passage immediately above the piston, and a valve for controlling the piston-port and having a stem extending freely through the piston-rod passage.

12. A lubricator of the character described, comprising a cylinder for the lubricant open at its upper end and having an outlet at its lower end, a support applied to the upper end of said cylinder and extending laterally therefrom, a laterally-slidable head guided on said support and movable to a position in line with or at one side of the cylinder, a piston operable in said cylinder and having a piston-rod extendng through said cylinder-head, the latter having a recess forming a continuation of the cylinder for receiving said piston, and releasable locking devices applied to said support for engagement with said slideable-head for holding it in either of the above-named positions.

13. A lubricator of the character described, comprising a cylinder for the lubricant open at its upper end, and having an outlet at its lower end, a support applied to the upper end of said cylinder, a laterally-slideable head guided on said support and movable to a position in line with or at one side of the cylinder, a piston operable in said cylinder including an actuating-screw extending through the top of the cylinder-head, the latter having a recess forming a continuation of the cylinder for receiving said piston, a crank-shaft journaled on said support, feed mechanism for the screw mounted on and movable as a unit with said cylinder-head and operatively connected with said crank-shaft, and means for temporarily disconnecting said feed mechanism from the screw to render the same inoperative when the cylinder-head is moved to a position at one side of the cylinder.

14. A lubricator of the character described, comprising a cylinder for the lubricant open at its upper end and having an outlet at its lower end, a piston operable in said cylinder, a head for the cylinder movable across the open end thereof to cover and uncover the same, and means mounted on said cylinder-head for moving the piston in its cylinder, said head having a recess in its bottom for receiving the piston and a chamber in its top for containing lubricant for the piston-operating means.

15. A lubricating apparatus, comprising a cylinder for the lubricant having an outlet, a piston operable in said cylinder, a platform applied to the upper end of said cylinder, a head for the cylinder guided on said platform for movement across the open end of said cylinder to cover and uncover the same, and means for moving said piston in its cylinder including an intermittent feed mechanism mounted on the cylinder-head, a driving shaft journaled at one end of said platform, a crank-shaft journaled on the latter and interposed between said cylinder and said driving shaft, and means for adjustably connecting said crank-shaft with said feed mechanism.

CHARLES W. MANZEL.